(12) United States Patent
Lee et al.

(10) Patent No.: US 11,489,179 B2
(45) Date of Patent: Nov. 1, 2022

(54) METHOD AND APPARATUS FOR MULTI-STAGE FAULT DIAGNOSIS OF FUEL CELL SYSTEMS

(71) Applicant: KOREA INSTITUTE OF ENERGY RESEARCH, Daejeon (KR)

(72) Inventors: Won Yong Lee, Daejeon (KR); Hwan Yeong Oh, Daejeon (KR); Min Jin Kim, Daejeon (KR); Seok Hee Park, Daejeon (KR); Gu Gon Park, Daejeon (KR); Tae Hyun Yang, Daejeon (KR); Sung Dae Yim, Daejeon (KR); Young Jun Sohn, Daejeon (KR); Byung Chan Bae, Daejeon (KR); Seung Gon Kim, Daejeon (KR); Dong Won Shin, Sejong-si (KR); Seung Hee Woo, Daejeon (KR); So Jeong Lee, Daejeon (KR); Hye Jin Lee, Daejeon (KR); Yoon Young Choi, Sejong-si (KR)

(73) Assignee: Korea Institute of Energy Research, Daejeon (KR)

( * ) Notice: Subject to any disclaimer, the term of this patent is extended or adjusted under 35 U.S.C. 154(b) by 401 days.

(21) Appl. No.: 16/777,492

(22) Filed: Jan. 30, 2020

(65) Prior Publication Data
US 2021/0075040 A1 Mar. 11, 2021

(30) Foreign Application Priority Data

Sep. 11, 2019 (KR) .................. 10-2019-0112544
Sep. 11, 2019 (KR) .................. 10-2019-0112547

(51) Int. Cl.
*H01M 8/04* (2016.01)
*H01M 8/04664* (2016.01)
*H01M 8/04992* (2016.01)

(52) U.S. Cl.
CPC ... *H01M 8/04679* (2013.01); *H01M 8/04686* (2013.01); *H01M 8/04992* (2013.01)

(58) Field of Classification Search
CPC ......... H01M 8/04679; H01M 8/04686; H01M 8/04992
(Continued)

(56) References Cited

U.S. PATENT DOCUMENTS 9,582,618 B1 * 2/2017 Doraiswami ...... G05B 23/0254
2017/0213303 A1 * 7/2017 Papadopoulos ....... G06F 16/248

FOREIGN PATENT DOCUMENTS

JP   2003050701 A   2/2003
JP   2008084730 A   4/2008
(Continued)

OTHER PUBLICATIONS

Won-Yong Lee et al., "Fault Detection and Diagnosis Methods for Polymer Electrolyte Fuel Cell System", Trans. of Korean Hydrogen and New Energy Society, 2017, pp. 252-272, vol. 28, No. 3.

*Primary Examiner* — James M Erwin
(74) *Attorney, Agent, or Firm* — Rabin & Berdo, P.C.

(57) ABSTRACT

A hierarchical fault classification method for a fuel cell system, a multi-stage fault diagnosis method therefor, and a fault diagnosis device therefor are disclosed. The fuel cell system is divided into a subsystem, a component, and an element step by step. The multi-stage fault diagnosis method includes detecting a subsystem, a fault of which occurs, in the fuel cell system composed of a plurality of subsystems and detecting an upper-level component, which causes the fault, among upper-level components included in the subsystem, the fault of which occurs, using measurement data and a control signal.

17 Claims, 8 Drawing Sheets

(58) Field of Classification Search
USPC .......................................................... 702/60
See application file for complete search history.

(56) References Cited

FOREIGN PATENT DOCUMENTS

| | | | |
|---|---|---|---|
| JP | 2019139375 | A | 8/2019 |
| KR | 10-1610534 | B1 | 4/2016 |
| KR | 10-2016-0120556 | A | 10/2016 |
| KR | 10-2016-0133895 | A | 11/2016 |
| WO | 2005088753 | A1 | 9/2005 |

* cited by examiner

| Portion | Output characteristic value | Input and analytic overlap formula | Residual |
|---|---|---|---|
| Stack | Stack voltage $V_{stack}$ | Stack load/stack flow, temperature, pressure value, or control signal of pump, blower, or the like $V_{stack\_p} = F(I_{stack\_m}, U_{air}, U_{fuel} \ldots)$ | $R_{stack} = \|V_{stack\_p} - V_{stack\_m}\|$ |
| Air supply device | Air flow ($Q_{air}$) | Control signal/stack load $Q_{air\_p} = F(U_{air}, I_{stack\_m})$ | $R_{air} = \|Q_{air\_p} - Q_{air\_m}\|$ |
| Water management device | Efficiency of humidifier ($\eta_{hum}$) | Temperature at inlet and outlet of humidifier/stack load $\eta_{hum\_p} = F(T_{airin\_m}, T_{airstackin\_m}, T_{airstackout\_m}, T_{exhaust\_m}, I_{stack\_m})$ | $R_{water} = \|\eta_{hum\_p} - \eta_{hum\_m}\|$ |
| Heat management device | Coefficient of heat transfer of heat exchanger ($UA_h$) | 1) Temperature at inlet and outlet of heat exchanger/stack heat load $UA_{h\_m} = F(T_{stackin\_m}, T_{stackout\_m}, T_{reservoirout\_m}, T_{reservoirin\_m}, Q_{stack\_m})$ 2) Control signal/temperature at inlet of heat exchanger $UA_{h\_p} = F(U_{pump1}, U_{pump2}, T_{reservoirin\_m})$ | $R_{heat} = \|UA_{h\_p} - UA_{h\_m}\|$ |
| Fuel supply device | Fuel flow ($Q_{fuel}$) | Control signal/fuel flow $Q_{fuel\_p} = F(U_{fuel}, I_{stack\_m})$ or $F(U_{PNG}, I_{stack\_m}, T_{SR}, T_{LTS}, T_{PrOx})$ | $R_{fuel} = \|Q_{fuel\_p} - Q_{fuel\_m}\|$ |

FIG. 6

| | Residual pattern | | | | | Neural Network Pattern | | | | | | Classification Learner Pattern | Notes |
|---|---|---|---|---|---|---|---|---|---|---|---|---|---|
| | $R_{stack}$ | $R_{air}$ | $R_{water}$ | $R_{heat}$ | $R_{fuel}$ | | | | | | | | |
| Normal | 0 | 0 | 0 | 0 | 0 | 1 | 0 | 0 | 0 | 0 | 0 | 1 | Normal |
| Stack | 1 | 0 | 0 | 0 | 0 | 0 | 1 | 0 | 0 | 0 | 0 | 2 | fault or degradation |
| Air supply device | 0 | 1 | 0 | 0 | 0 | 0 | 0 | 1 | 0 | 0 | 0 | 3 | minor fault |
| | 1 | 1 | 0 | 0 | 0 | 0 | 0 | 1 | 0 | 0 | 0 | | significant fault |
| Water management device | 0 | 0 | 1 | 0 | 0 | 0 | 0 | 0 | 1 | 0 | 0 | 4 | minor fault |
| | 1 | 0 | 1 | 0 | 0 | 0 | 0 | 0 | 1 | 0 | 0 | | significant fault |
| | 1 | 1 | 1 | 0 | 0 | 0 | 0 | 0 | 1 | 0 | 0 | | |
| Heat management device | 0 | 0 | 0 | 1 | 0 | 0 | 0 | 0 | 0 | 1 | 0 | 5 | minor fault |
| | 1 | 0 | 0 | 1 | 0 | 0 | 0 | 0 | 0 | 1 | 0 | | significant fault |
| Fuel supply device | 0 | 0 | 0 | 0 | 1 | 0 | 0 | 0 | 0 | 0 | 1 | 6 | minor fault |
| | 1 | 0 | 0 | 0 | 1 | 0 | 0 | 0 | 0 | 0 | 1 | | significant fault |

FIG. 7

METHOD AND APPARATUS FOR MULTI-STAGE FAULT DIAGNOSIS OF FUEL CELL SYSTEMS

CROSS-REFERENCE TO RELATED APPLICATION(S)

This application claims the benefit of Korean Patent Application No. 10-2019-0112544 filed on Sep. 11, 2019, and Korean Patent Application No. 10-2019-0112547 filed on Sep. 11, 2019 in the Korean Intellectual Property Office, the disclosures of which are incorporated herein by reference.

BACKGROUND

1. Field of the Invention

Example embodiments relate to technologies of detecting and diagnosing a fault of a fuel cell system.

2. Description of the Related Art

A fuel cell system is a power generation system which converts chemical energy of fuel into electrical energy. The fuel cell system may include a plurality of subsystems. The subsystems included in the fuel cell system may include a stack, an air supply device, a heat management device, a fuel supply device, a water management device, a power inverter, and a controller, and the like. Each of the subsystems except for the stack among the subsystems may be collectively referred to as a balance of plant (BOP). The stack and the BOP vary in function and role in the fuel cell system.

SUMMARY

According to an aspect, there is provided a multi-stage fault diagnosis method for a fuel cell system, performed by a multi-stage fault diagnosis device sequentially dividing the fuel cell system into a system, a subsystem, an upper-level component, a lower-level component, and an element and diagnosing a fault of the fuel cell system.

The subsystem includes a stack, an air supply device, a heat management device, a fuel supply device, a water management device, and a power inverter and controller.

According to another aspect, there is provided a multi-stage fault diagnosis method for a fuel cell system, performed by a multi-stage fault diagnosis device including detecting a subsystem, a fault of which occurs, in the fuel cell system composed of a plurality of subsystems and detecting an upper-level component, which causes the fault, among upper-level components included in the subsystem, the fault of which occurs, using measurement data and a control signal.

The method may further include detecting a lower-level component, which causes the fault, among one or more lower-level components included in the upper-level component which causes the fault. The method may further include detecting an element, which causes the fault, among one or more elements included in the lower-level component which causes the fault.

The fuel cell system may include subsystems including a stack, an air supply device, a heat management device, a fuel supply device, a water management device, and a power inverter and controller.

The detecting of the subsystem, the fault of which occurs, may include, when it is detected that the fault occurs in the fuel cell system, determining whether the fault occurs in the stack or a balance of plant (BOP) including the air supply device, the heat management device, the fuel supply device, the water management device, and the power inverter and controller.

The determining whether the fault occurs may include determining whether the fault is irreversible due to an internal part of the stack or is reversible due to the BOP.

The detecting of the subsystem, the fault of which occurs, may include detecting the subsystem, the fault of which occurs, based on measurement data and a control signal for the plurality of subsystems.

The multi-stage fault diagnosis device may perform fault diagnosis for only the subsystem, the fault of which occurs, in the fuel cell system and may not perform the fault diagnosis for the other subsystems.

According to another aspect, there is provided a multi-stage fault diagnosis device for performing a multi-stage fault diagnosis method for a fuel cell system including a subsystem fault detector to detect a subsystem, a fault of which occurs, in the fuel cell system composed of a plurality of subsystems and a component fault detector to detect an upper-level component, which causes the fault, among upper-level components included in the subsystem, the fault of which occurs, using measurement data and a control signal.

The component fault detector may detect a lower-level component, which causes the fault, among one or more lower-level components included in the upper-level component which causes the fault.

The multi-stage fault diagnosis device may further include an element fault detector to detect an element, which causes the fault, among one or more elements included in the lower-level component which causes the fault.

The fuel cell system may include subsystems including a stack, an air supply device, a heat management device, a fuel supply device, a power inverter, a water management device, and a controller.

When it is detected that the fault occurs in the fuel cell system, the subsystem fault detector may determine whether the fault occurs an internal part of the stack or a balance of plant (BOP).

The subsystem fault detector may include a stack fault detector. The stack fault detector may determine whether the fault is irreversible due to the internal part of the stack or is reversible due to the BOP.

The subsystem fault detector may detect the subsystem, the fault of which occurs, based on measurement data and a control signal for the plurality of subsystems.

The multi-stage fault diagnosis device may perform fault diagnosis for only the subsystem, the fault of which occurs, in the fuel cell system and may not perform the fault diagnosis for the other subsystems.

According to another aspect, there is provided a multi-stage fault diagnosis device for diagnosing a fault of a fuel cell system including a plurality of subsystems including a subsystem fault detector to detect a subsystem, a fault of which occurs, among the plurality of subsystems using measurement data using a sensor and a component fault detector to detect an upper-level component, which causes the fault, among upper-level components included in the subsystem, the fault of which occurs.

According to another aspect, there is provided a multi-stage fault diagnosis method including predicting a characteristic value for each of the plurality of subsystems constituting the fuel cell system, calculating a residual value for each subsystem based on the characteristic value and a measurement value, and detecting the subsystem, the fault of which occurs, among the subsystems using residual values for the subsystems and a classifier.

The detecting may include determining a residual pattern value for the subsystems based on the result of comparing the residual value for each subsystem with a threshold corresponding to each subsystem.

The detecting may include obtaining a classification pattern value for fault detection using the classifier which receives the residual pattern value and determining the subsystem, the fault of which occurs, among the subsystems using the obtained classification pattern value.

The classifier may obtain the classification pattern value based on machine learning including at least one of an artificial neural network (ANN), a support vector machine (SVM), a linear regression equation, a general regression neural network (GRNN), and ensemble regression.

The threshold may be set based on a standard deviation value of a residual value calculated in a state where each subsystem is normal.

The threshold may have a value of an integer multiple of the standard deviation value.

The predicting of the characteristic value may include predicting the characteristic value using at least one of an ANN, an SVM, a linear regression equation, a GRNN, and ensemble regression.

The predicting of the characteristic value may include predicting the characteristic value using a measurement value of a sensor included in the fuel cell system and a control signal.

The characteristic value may be a characteristic value representing each subsystem, which is a value capable of being shown for a fault which occurs in at least one of components and elements in the subsystem, and may include at least one of an efficiency equation, a heat transfer rate, a dimensionless coefficient, which is converted into at least one of an output variable and an input and output variable of the subsystem.

The calculating of the residual value may include normalizing the residual value for each subsystem.

The normalizing may include calculating the ratio of a value obtained by subtracting a minimum residual value from the residual value to a value obtained by subtracting the minimum residual value from a maximum residual value of each subsystem and normalizing the residual value.

According to another aspect, there is provided a multi-stage fault diagnosis device for performing a multi-stage fault diagnosis method for a fuel cell system including a prediction unit to predict a characteristic value for each of a plurality of subsystems constituting a fuel cell system, a calculation unit to calculate a residual value for each subsystem based on the characteristic value and a measurement value, and a fault detector to detect a subsystem, a fault of which occurs, among the subsystems using residual values for the subsystems and a classifier.

The fault detector may determine a residual pattern value for the subsystems based on the result of comparing the residual value for each subsystem with a threshold corresponding to each subsystem.

The fault detector may obtain a classification pattern value for fault detection using the classifier which receives the residual pattern value and may determine the subsystem, the fault of which occurs, among the subsystems using the obtained classification pattern value.

The classifier may obtain the classification pattern value based on machine learning including at least one of an ANN, an SVM, a linear regression equation, a GRNN, and ensemble regression.

The threshold may be set based on a standard deviation value of a residual value calculated in a state where each subsystem is normal.

The threshold may have a value of an integer multiple of the standard deviation value.

The prediction unit may predict the characteristic value using at least one of an ANN, an SVM, a linear regression equation, a GRNN, and ensemble regression.

The prediction unit may predict the characteristic value using a measurement value of a sensor included in the fuel cell system.

The calculation unit may normalize the residual value for each subsystem.

The calculation unit may calculate the ratio of a value obtained by subtracting a minimum residual value from the residual value to a value obtained by subtracting the minimum residual value from a maximum residual value of each subsystem and may normalize the residual value.

According to another aspect, there is provided a multi-stage fault diagnosis device for performing a multi-stage fault diagnosis method including a prediction unit to predict a characteristic value for each of a plurality of subsystems constituting a fuel cell system using an analytic overlap formula, a calculation unit to calculate a residual value for each subsystem based on the predicted characteristic value and a measurement value measured by sensors and normalize the calculated residual values, and a fault detector to detect a subsystem, a fault of which occurs, based on the normalized residual values.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 6 is a drawing illustrating an example of calculating a residual value based on a characteristic value for each subsystem according to an embodiment;

FIG. 7 is a drawing illustrating an example of diagnosing a fault of a fuel cell system based on a residual pattern value and a classification pattern value according to an embodiment.

DETAILED DESCRIPTION

Figure 1:
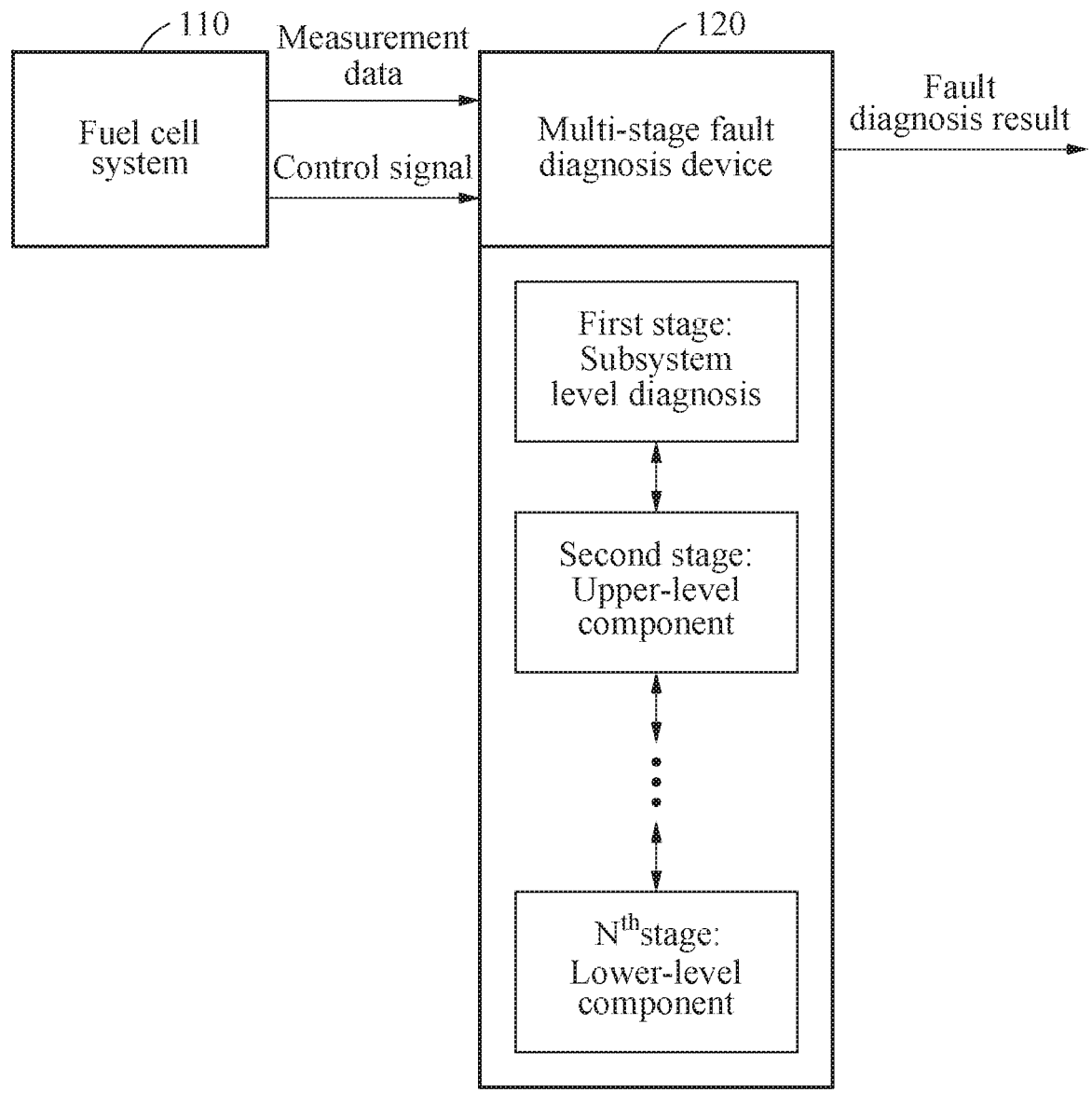
FIG. 1 is a drawing illustrating a high-level overview of a multi-stage fault diagnosis system according to an embodiment.

Specific structural or functional descriptions of embodiments are disclosed for the purpose of being merely illustrative and may be modified and executed in various forms. Therefore, embodiments are not limited to specific disclosed forms, and the scope of the specification includes changes, equivalents, or substitutes included in the technical scope.

Terms such as "first" and "second" may be used in describing various components, but it should be interpreted that such terms are used only to distinguish one component from the other. Furthermore, it will be understood that when a component is referred to as being "coupled to" or "connected to" another component, it may be directly coupled to or connected to the other component or an intervening component may be present.

The expression of singular number includes the expression of plural number unless clearly intending otherwise in a context. In the specification, it should be understood that terms of 'comprise', 'have', and the like are to designate the existence of a feature disclosed in the specification, a numeral, a step, an input, a constituent element, a part, or a combination thereof, and do not previously exclude a possibility of existence or supplement of one or more other features, numerals, steps, inputs, constituent elements, parts, or combinations thereof.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the inventive concept.

Hereinafter, a description will be given in detail of embodiments with reference to the accompanying drawings. In describing embodiments with reference to the accompanying drawings, the same reference denotations are assigned to the same elements without regard to the drawing denotations, a duplicated description thereof will be omitted.

FIG. 1 is a drawing illustrating a high-level overview of a multi-stage fault diagnosis system according to an embodiment.

To detect a fault of a fuel cell system 110 and accurately diagnose the cause of the fault, the multi-stage fault diagnosis system may approach the fuel cell system 110 from a system stage to an element stage in a multi-stage manner. The multi-stage fault diagnosis system may diagnose the cause of the fault in top-down flow for the fuel cell system 110 classified into a subsystem, a component, and an element in a sequential manner. As a result, the fuel cell system 110 may detect whether a fault occurs in any portion of the fuel cell system 110 and may restrict the cause of the fault of the fuel cell system 110 to a specific portion, thus easily performing subdivided fault diagnosis.

Referring to FIG. 1, the multi-stage fault diagnosis system may include the fuel cell system 110 and a multi-stage fault diagnosis device 120. In an embodiment, the multi-stage fault diagnosis device 120 may collect measurement data and a control signal from the fuel cell system 110. The multi-stage fault diagnosis device 120 may calculate a fault diagnosis result for the fuel cell system 100 based on the measurement data and the control signal. The used data may include all of sensor values measured automatically and manually and control signals.

In an embodiment, the multi-stage fault diagnosis device 120 may detect a fault of the fuel cell system 110 based on the measurement data and the control signal and may diagnose whether a fault occurs in any portion of the fuel cell system 110.

The multi-stage fault diagnosis device 120 may diagnose the fuel cell system 100 in a hierarchical manner to detect whether a fault occurs in the fuel cell system 100. While gradually reducing components of the fuel cell system 100 from a large range to a small range, the multi-stage fault diagnosis device 120 may diagnose whether a fault occurs in the fuel cell system 120. As such, the multi-stage fault diagnosis device 120 may prevent unnecessary fault diagnosis from being performed for a component which operates normally and may more quickly and efficiently diagnose a fault of the fuel cell system 100 by diagnosing the fault of the fuel cell system 110 in the hierarchical manner.

In an embodiment, the multi-stage fault diagnosis device 120 may sequentially divide the fuel cell system 110 into a system, a subsystem, an upper-level component, a lower-level component, and an element depending on a layer to diagnose a fault of the fuel cell system 110. Herein, the subsystem may include a stack, an air supply device, a heat management device, a fuel supply device, a water management device, and a power inverter and controller.

The subsystem in the specification may be referred to as a portion, and the component may be referred to as a part. Furthermore, the element in the specification may be referred to as a constituent element.

Hereinafter, a description will be given in detail of a multi-stage fault diagnosis method with reference to the accompanying drawings.

Figure 2:
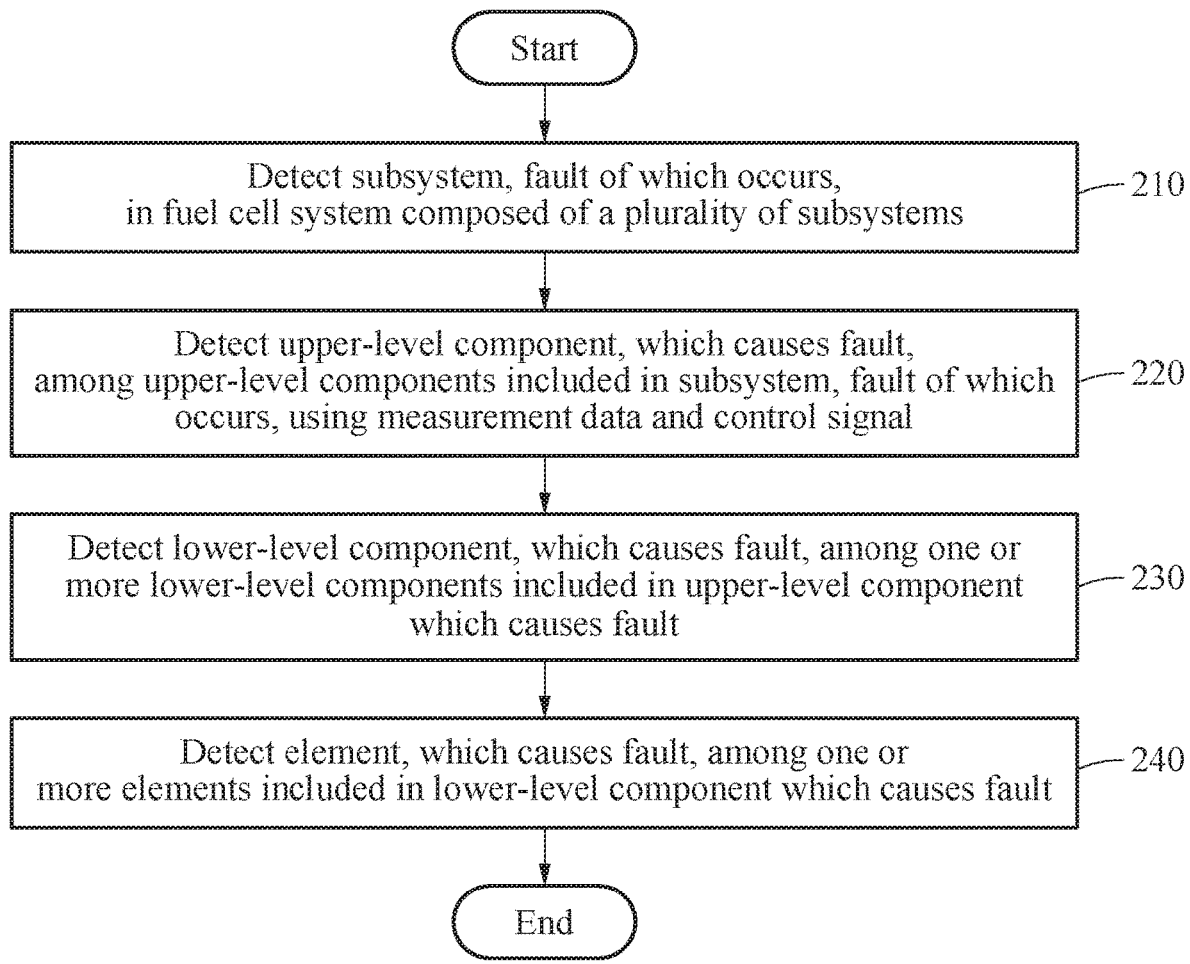
FIG. 2 is a flowchart illustrating a multi-stage fault diagnosis method according to an embodiment.

FIG. 2 is a flowchart illustrating a multi-stage fault diagnosis method according to an embodiment.

Referring to FIG. 2, in operation 210, a multi-stage fault diagnosis device may detect a subsystem, a fault of which occurs, in a fuel cell system composed of a plurality of subsystems. Herein, the fuel cell system may be divided into subsystems including a stack, an air supply device, a heat management device, a fuel supply device, a water management device, and a power inverter and controller. In an embodiment, the multi-stage fault diagnosis device may detect a subsystem, a fault of which occurs, based on measurement data and a control signal for the plurality of subsystems.

When it is detected that the fault occurs in the fuel cell system, the multi-stage fault diagnosis device may determine whether the fault occurs due to an internal part of the stack or due to a balance of plant (BOP). When the fault occurs in the stack, the cause of the fault may be the fault of the stack itself, but, according to an embodiment, it may be diagnosed that the fault occurs in the stack due to the fault of the BOP. Thus, when it is determined that the fault occurs in the stack, only if the cause is accurately identified as the fault of the stack or as the fault of the BOP, a response to the fault of the fuel cell system may be suitably performed. Furthermore, the multi-stage fault diagnosis device may determine whether the fault which occurs in the stack is irreversible due to an internal part of the stack or is reversible due to the BOP. It is difficult to be restored for the fault (a so-called 'irreversible fault') of the stack itself, but, when the BOP returns to a normal state for the fault (a so-called 'reversible fault') of the BOP, it is possible to recover performance of the stack.

The multi-stage fault diagnosis device may perform fault diagnosis for only the subsystem, the fault of which occurs, in the fuel cell system and may not perform fault diagnosis for the other subsystems. In other words, only for the subsystem, the fault of which occurs, in the fuel cell system, the multi-stage fault diagnosis device may perform fault diagnosis for at least one of a component and an element included in the subsystem.

In operation 220, the multi-stage fault diagnosis device may detect an upper-level component, which causes the fault, among upper-level components included in the subsystem, the fault of which occurs, using measurement data, a control signal, and the like. When the upper-level component does not include a lower-level component, a user or a manager may take a measure of the detected upper-level component which causes the fault to restore the fuel cell system to a normal state.

When the upper-level component includes one or more lower-level components, in operation 230, the multi-stage fault diagnosis device may detect a lower-level component, which causes the fault, among the one or more lower-level components included in the upper-level component which causes the fault. When the lower-level component does not include an element, the user or the manager may take a measure of the detected lower-level component which causes the fault to restore the fuel cell system to the normal state.

When the lower-level component includes one or more elements, in operation 240, the multi-stage fault diagnosis device may detect an element, which causes the fault, among the one or more elements included in the lower-level component which causes the fault. The user or the manager may take a measure of the detected element which causes the fault to restore the fuel cell system to the normal state.

According to an embodiment described in the specification, the multi-stage fault diagnosis device may easily diagnose whether a fault occurs in any subsystem in the fuel cell system. Furthermore, because the multi-stage fault diagnosis device is able to diagnose whether the fault occurs in any subsystem in the fuel cell system, the user or the manager may take a suitable measure according to the occurrence of the fault.

According to an embodiment, the multi-stage fault diagnosis device may previously discover an initial fault which has little influence immediately as well as a sudden fault of the BOP, which results in the damage of the stack in a fault detection stage for each subsystem of the fuel cell system, and may take a measure of the fault, thus contributing improving long-term reliability of the fuel cell system. Furthermore, according to an embodiment, the multi-stage fault diagnosis device may promote the improvement of performance and durability of a fuel cell, thus promoting system stability which is an essential requirement for commercializing a fuel cell for home/building and for car.

Figure 3:
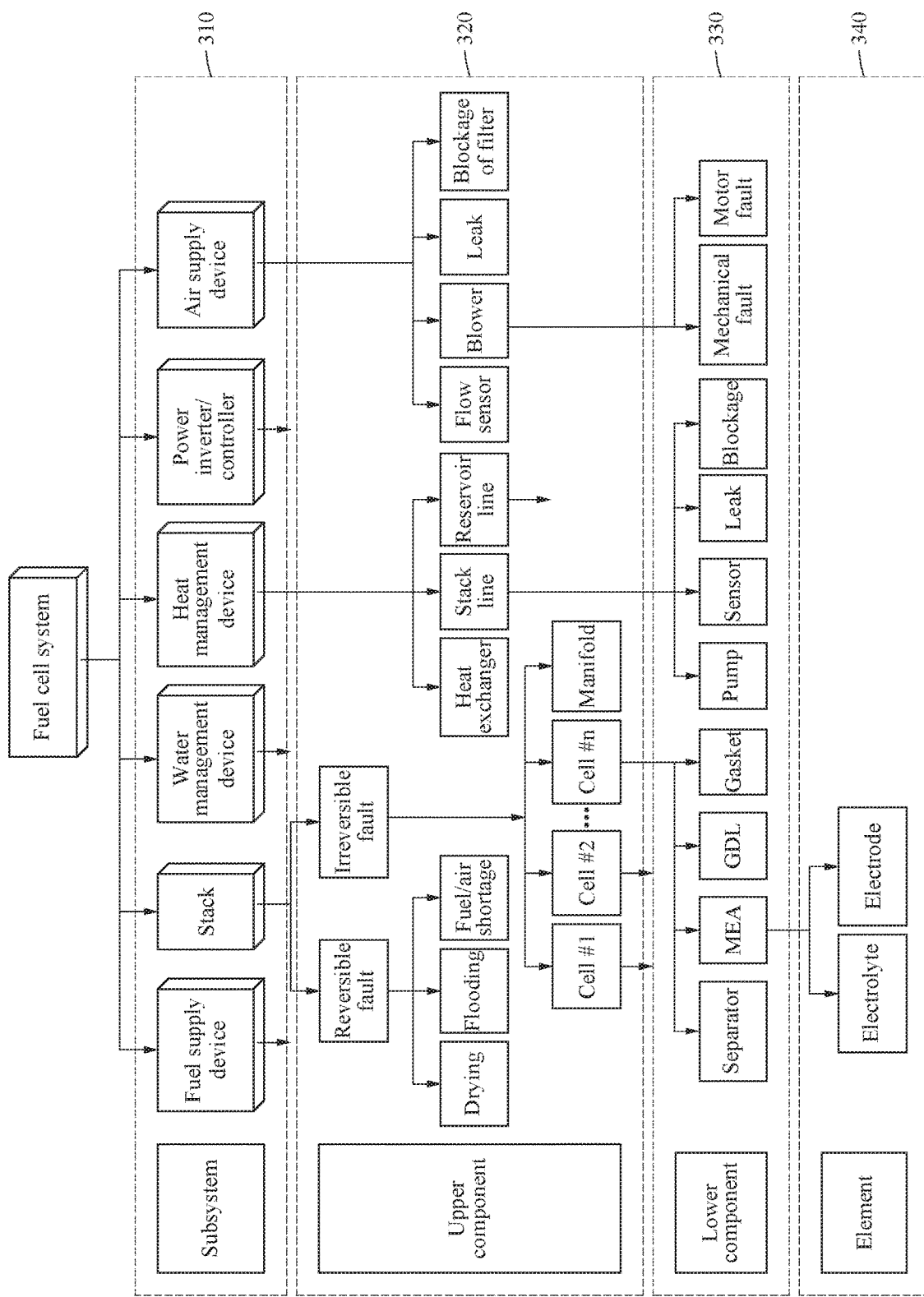
FIG. 3 is a drawing illustrating a configuration of a fuel cell system according to an embodiment.

FIG. 3 is a drawing illustrating a configuration of a fuel cell system according to an embodiment.

Referring to FIG. 3, the fuel cell system may include a plurality of subsystems 310. Furthermore, the plurality of subsystems 310 may include one more components 320 and 330. Herein, the components may be composed of the upper-level component 320 and the lower-level component 330. When the components 320 and 330 are composed of the upper-level component 320 and the lower-level component 330, the upper-level component 320 may include the lower-level component 330. The lower-level component 330 may include one or more elements 340.

In an embodiment, the subsystems 310 may be divided into a fuel supply device, a stack, a power inverter/controller, an air supply device, a water management device, and a heat management device.

The heat supply device may perform a function of supplying fuel by directly using hydrogen or by using hydrogen converted using fossil fuels. The stack may be a subsystem which produces power. The power inverter/controller may be a subsystem which converts power and performs control. The air supply device may interlock with a stack load to control the amount of air. The water management device may be a portion of at least one of the air supply device, the fuel supply device, or the heat management device, which is provided in the center of a humidifier to adjust humidity of air or fuel. The heat management device may perform a function of suitably maintaining a temperature of the stack.

The stack may be classified into a reversible fault where it is able to recover performance and an irreversible fault where it is difficult to recover performance. The reversible fault of the stack may include drying, flooding, and fuel/air shortage state. This may be mainly generated by a fault of a BOP. The irreversible fault may be a fault of the stack itself, which includes n cells, a manifold, an end plat, and the like as the upper-level components 320. Each cell may include the lower-level components 330 including a separator, a membrane-electrode assembly (MEA), a gas diffusion layer (GDL), and a gasket. The MEA may include an electrolyte and an electrode as the elements 340.

The air supply device may include a blower, a filter, a sensor, and a line as the upper-level components 320 and may include a mechanical fault and an electrical motor fault of a bearing, a rotary device, and the like in the blower as the lower-level components 330. The heat management deice may include a stack line, a heat exchanger, and a reservoir line as the upper-level components 320. Each of the stack line and the reservoir line may include a pump, a sensor, a pipe, and the like as the lower-level components 330.

Figure 4:
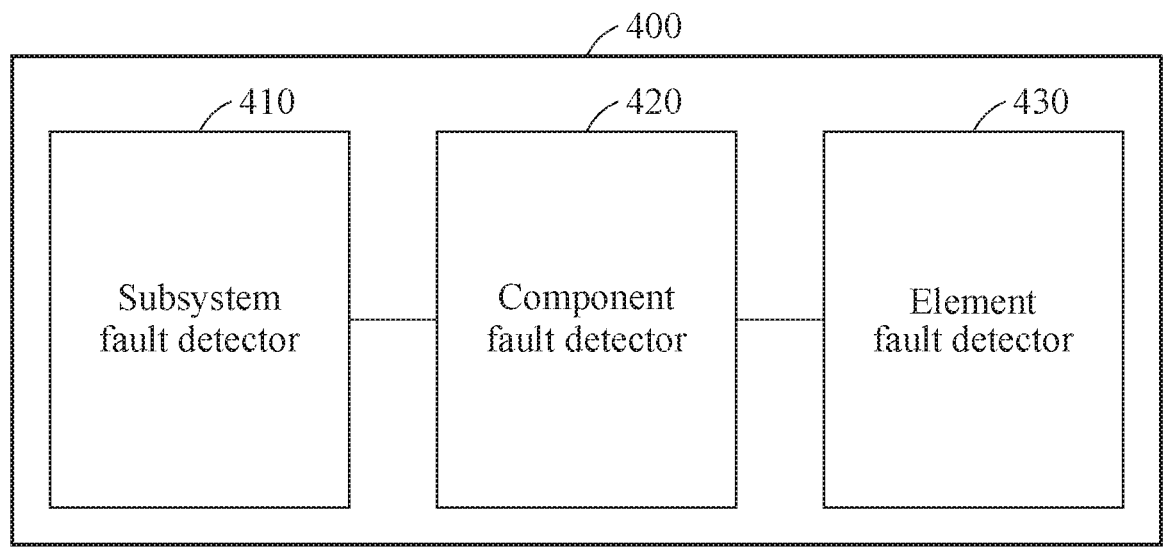
FIG. 4 is a block diagram illustrating a configuration of a multi-stage fault diagnosis device according to an embodiment.

FIG. 4 is a block diagram illustrating a configuration of a multi-stage fault diagnosis device according to an embodiment.

Referring to FIG. 4, a multi-stage fault diagnosis device 400 may correspond to a multi-stage fault diagnosis device which performs the multi-stage fault diagnosis method described in the specification. In an embodiment, the multi-stage fault diagnosis device 400 may include a subsystem fault detector 410, a component fault detector 420, and an element fault detector 430.

The subsystem fault detector 410 may detect a subsystem, a fault of which occurs, among a plurality of subsystems using measurement data using a sensor and a control signal. In an embodiment, the subsystem fault detector 410 may detect a subsystem, a fault of which occurs, in a fuel cell system composed of subsystems including a stack, an air supply device, a heat management device, a fuel supply device, a water management device, and a power inverter and controller. Furthermore, when it is detected that the fault occurs in the fuel cell system, the subsystem fault detector 410 may determine whether the fault occurs in the stack or in a BOP.

For example, the subsystem fault detector 410 may calculate a characteristic value for each subsystem and a residual. The subsystem fault detector 410 may analyze the calculated residual based on the measurement data. The subsystem fault detector 410 may detect a subsystem, a fault of which occurs, based on a pattern where the residual deviates from a predetermined allowable value. The characteristic value for each subsystem may be referred to as an analytical superposition formula.

The analytical superposition formula may be a formula for calculating a specific measurement value using a measurement value of a sensor which varies in characteristic or location. To this end, at least one regression model equation among an artificial neural network (ANN), a support vector machine (SVM), a linear regression equation, a general regression neural network (GRNN), and ensemble regression may be used.

The residual may refer to a difference between a predicted value and a measurement value or may refer to a difference between a predicted value and a predicted value calculated using another model equation. The subsystem fault detector 410 may normalize a residual value such that the calculated residual value has relatively the same magnitude for different faults.

The allowable value may be determined based on a standard deviation value of a residual calculated in a state where a fault does not occur in each subsystem. For example, the allowable value may become n times of the standard deviation value of the residual calculated in the state where the fault does not occur in each subsystem. Herein, n may be a natural number.

The subsystem fault detector 410 may diagnose whether a fault occurs for each subsystem, using at least one regression model equation among a neural network, an SVM, a linear regression equation, a GRNN, and ensemble regression by using the pattern of the residual as a fault classification pattern, thus detecting a subsystem, a fault of which occurs.

To detect the fault of the subsystem, the subsystem fault detector 410 may use a characteristic formula capable of verifying whether the fault occurs in the subsystem and a characteristic value.

For example, to determine whether a fault occurs in a stack, the subsystem fault detector 410 may use a relationship between voltage and current according to a process state. Furthermore, the subsystem fault detector 410 may detect a fault of the subsystem using a change in the amount of air predicted through an air supply device. The subsystem fault detector 410 may detect a fault of a water management device using a monitoring variable of a system interacting with the water management device and may detect a fault of a fuel supply device using a measurement variable for control of each system, a control signal, and an added monitoring signal.

According to an embodiment, the subsystem fault detector 410 may include a stack fault detector. The stack fault detector may determine whether the fault of the stack is irreversible due to an internal part of the stack or is reversible due to a BOP.

The component fault detector 420 may detect a component, which causes the fault, among components included in the subsystem, the fault of which occurs. In an embodiment, the component fault detector 420 may detect an upper-level component, which causes the fault, among upper-level components included in the subsystem, the fault of which occurs, using measurement data and a control signal for a plurality of subsystems. Furthermore, according to an embodiment, the component fault detector 420 may detect a lower-level component, which causes the fault, among one or more components included in the upper-level component which causes the fault.

In an embodiment, when it is determined that the fault occurs in an air supply device, the component fault detector 420 may determine whether the fault occurs in a component including a blower (compressor), a sensor, a line (pipe), a filter, or the like, using at least one of the amount of air, a control signal, and a pressure signal.

In another embodiment, when it is determined that the fault occurs in a heat management device, the component fault detector 420 may detect the fault of a driving pump and valve for control, a sensor, and a heat exchanger.

The element fault detector 430 may detect an element, which causes the fault, among one or more elements included in any one of the upper-level component or the lower-level component, which causes the fault.

Figure 5:
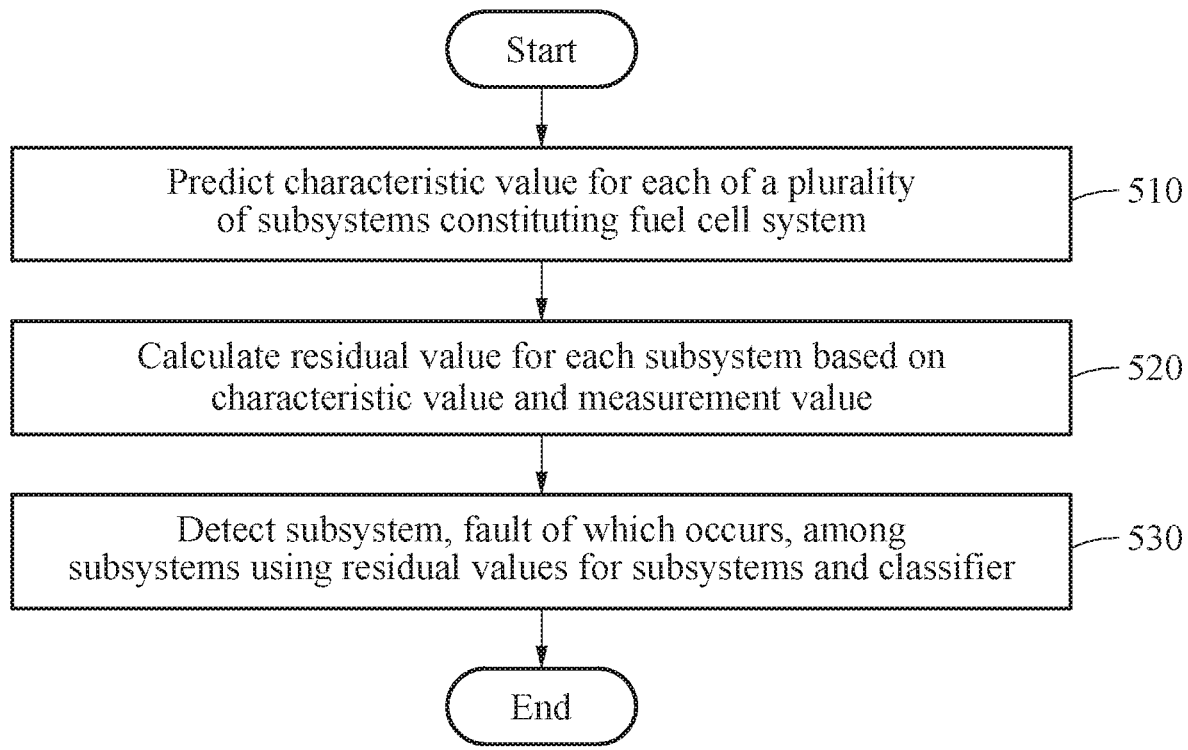
FIG. 5 is a flowchart illustrating a fault diagnosis method of a fuel cell system according to another embodiment.

FIG. 5 is a flowchart illustrating a fault diagnosis method of a fuel cell system according to another embodiment. The fault diagnosis method shown in FIG. 5 may be included in an operation of sequentially dividing a fuel cell system into a system, a subsystem, an upper-level component, a lower-level component, and an element depending on a layer and diagnosing a fault of the fuel cell system.

Referring to FIG. 5, in operation 510, a multi-stage fault diagnosis device may predict a characteristic value for each of a plurality of subsystems constituting the fuel cell system. In an embodiment, the multi-stage fault diagnosis device may predict a characteristic value based on an analytical superposition formula and a measurement value obtained from a sensor included in the fuel cell system. Herein, the analytical superposition formula may refer to a formula capable of predicting a specific measurement value based on a measurement value of a sensor which varies in characteristic or location and a control signal. Furthermore, machine learning including at least one of an ANN, an SVM, a linear regression equation, a GRNN, and ensemble regression may be used as the analytical superposition formula. The multi-stage fault diagnosis device may predict a characteristic value using at least one of various regression model equations through the analytical superposition formula.

In operation 520, the multi-stage fault diagnosis device may calculate a residual value for each subsystem based on the characteristic value and the measurement value.

In an embodiment, the multi-stage fault diagnosis device may calculate an absolute value of a value obtained by subtracting the measurement value from the characteristic value as a residual value. Furthermore, the multi-stage fault diagnosis device may normalize the residual value for each subsystem. For example, the multi-stage fault diagnosis device may calculate the ratio of a value obtained by subtracting a minimum residual value from the residual value to a value obtained by subtracting the minimum residual value from a maximum residual value obtained from driving data of a normal state in each subsystem. The maximum residual value and the minimum residual value may be calculated based on a multiple of a standard deviation obtained in the normal state. The multi-stage fault diagnosis device may normalize the residual value to have relatively the same value for different faults. The method for normalizing the residual value according to an embodiment may be represented as Equation 1 below.

$$\overline{R} = \frac{R - R_{min}}{R_{max} - R_{min}} \qquad [\text{Equation 1}]$$

In Equation 1 above, $R_{max}$ denotes the maximum residual value and $R_{min}$ denotes the minimum residual value. R denotes the current residual value, and $\overline{R}$ denotes the normalized residual value.

The method for normalizing the residual value according to another embodiment may be represented as Equation 2 below.

$$\overline{R} = \frac{R - R_{avg}}{n \times R_{std}} \qquad [\text{Equation 2}]$$

In Equation 2, $R_{avg}$ denotes the average value of the residual values and $R_{std}$ denotes the standard deviation of the residual values. R denotes the current residual value and $\overline{R}$ denotes the normalized residual value. n is any constant, which is a constant determined according to the experiment. Residual values described below may indicate normalized residual values.

In operation 530, the multi-stage fault diagnosis device may detect a subsystem, a fault of which occurs, among the subsystems using residual values for the subsystems and a classifier. In an embodiment, the multi-stage fault diagnosis device may determine a residual pattern value for the subsystems based on the result of comparing the residual value for each subsystem with a threshold corresponding to each subsystem. Herein, the threshold may be set based on a standard deviation value of a residual value calculated in a state where each subsystem is normal. For example, the threshold may be a value of a multiple of the standard deviation value of the residual value calculated in the state where each subsystem is normal.

In the above embodiment, the multi-stage fault diagnosis device may compare a residual value for one subsystem with a threshold for the one subsystem. The multi-stage fault diagnosis device may determine a residual pattern value based on a pattern where the residual value deviates from an allowable value according to the threshold. In this case, the multi-stage fault diagnosis device may reflect fault severity in a residual pattern with regard to a characteristic of a fuel cell system.

The multi-stage fault diagnosis device may obtain a classification pattern value for fault detection using a classifier which receives the residual pattern value. Herein, the classifier may obtain the classification pattern value based on machine learning including at least one of an ANN, an SVM, a linear regression equation, a GRNN, and ensemble regression. The multi-stage fault diagnosis device may determine a subsystem, a fault of which occurs, among the subsystems using the obtained classification pattern value.

FIG. 6 is a drawing illustrating an example of calculating a residual value based on a characteristic value for each subsystem according to an embodiment.

Referring to FIG. 6, a multi-stage fault diagnosis device may calculate a residual value for each subsystem based on a characteristic value and a measurement value for each subsystem.

The residual value of each subsystem may be a value capable of being shown for all faults in a component or an element in the subsystem, which is calculated through an efficiency equation, a heat transfer rate, a dimensionless coefficient, and the like converted into an output variable or an input and output variable of the subsystem.

For example, the multi-stage fault diagnosis device may calculate a residual value for a stack based on a characteristic value and a measurement value for the stack. The characteristic value of the stack may be a characteristic value of a stack voltage. The characteristic value of the stack may be calculated by receiving a stack load, fuel or air flow, temperature, a pressure value, and a control signal of a pump, a blower, or the like. The residual value of the stack may be an absolute value of a value obtained by subtracting the measurement value of the stack from the characteristic value of the stack.

Moreover, the multi-stage fault diagnosis device may calculate a residual value for an air supply device based on a measurement value and a control signal of the air supply device. A characteristic value of the air supply device may be air flow or pressure. The characteristic value of the air supply device may be calculated by receiving a control signal and a stack load. The residual value of the air supply device may be an absolute value of a value obtained by subtracting a measurement value of the air supply device from the characteristic value of the air supply device.

A characteristic value of a water management device may be an air temperature at an outlet of a humidifier (or an outlet of the stack) or efficiency of the humidifier. The characteristic value of the water management device may be calculated by receiving a temperature at an input and outlet of the humidifier, air flow, and a stack load. A residual value of the water management device may be an absolute value of a value obtained by subtracting a measurement value of the water management device from the characteristic value of the water management device.

A characteristic value of a heat management device may be cooling water flow of a stack line or a cooling vat line or a heat transfer rate of a heat exchanger. When the characteristic value of the heat management device is the stack line, it may be calculated by receiving a pump control signal. When the characteristic value of the heat management device is the cooling water flow of the cooling vat line, it may be calculated by receiving a temperature at an input and output let of the heat exchanger and a stack heat load. When the characteristic value of the heat management device is the heat transfer rate of the heat exchanger, it may be calculated by receiving a temperature at the inlet and outlet of the heat exchanger and a stack heat load. A residual value of the heat management device may be an absolute value of a value obtained by subtracting a measurement value of the heat management device from the characteristic value of the heat management device.

A characteristic value of a fuel supply device may be fuel flow. The characteristic value of the fuel supply device may be calculated by receiving a control signal and fuel flow. When a reformer is applied, the characteristic value may be calculated by using a control signal of the reforming gas blower and reformer operating temperatures. A residual value of the fuel supply device may be an absolute value of a value obtained by subtracting a measurement value of the fuel supply device from the characteristic value of the fuel supply device.

FIG. 7 is a drawing illustrating an example of diagnosing a fault of a fuel cell system based on a residual pattern value and a classification pattern value according to an embodiment.

Referring to FIG. 7, when it is classified into when the fuel cell system is normal and when a fault occurs in the fuel cell system as the fault occurs in each subsystem, a residual pattern value according to residual values of a stack, an air supply device, a water supply device, a heat supply device, and a fuel supply device may be calculated. The residual pattern value may be input to a classifier, and the classifier may receive the residual pattern value and may calculate a classification pattern value for detecting a subsystem, a fault of which occurs, in the fuel cell system.

The classifier may calculate the classification pattern value through a regression model equation including at least one of an ANN, an SVM, a linear regression equation, a GRNN, and ensemble regression.

When a fault occurs in the fuel cell system, a multi-stage fault diagnosis device may perform subdivided fault diagnosis based on at least one of the residual pattern value, the classification pattern value calculated by the classifier, and a machine learning classification pattern.

Herein, the residual pattern value may be determined based on a pattern where the residual value deviates from a threshold. In an embodiment, when the residual value is greater than or equal to the threshold, the residual pattern value may be 1. When the residual value is less than the threshold, the residual pattern value may be 0.

For example, when all of residual pattern values of subsystems are calculated as 0, when a value the classifier receives the residual pattern values and outputs is '100000', and when the machine learning classification pattern is 1, the multi-stage fault diagnosis device may determine that the fuel cell system is in a normal state where a fault does not occur in the fuel cell system.

When a residual pattern value of the stack and a residual pattern value of the air supply device is 1, when residual pattern values of the other subsystems except for the stack and the air supply device are 0, and when the classifier calculates the classification pattern value as '010000' based on the residual pattern values, the multi-stage fault diagnosis device may determine that a fault occurs in the stack, based on the residual pattern value, the classification pattern value, and the machine learning classification pattern. In detail, in this case, as the fault occurs in the air supply device and the stack, the multi-stage fault diagnosis device may determine that the fault occurs in the stack.

In another embodiment, the classification pattern value output from the classifier may indicate fault severity. For example, a classification pattern value corresponding to each subsystem may have a classification pattern value displayed with a decimal point between 0 and 1 according to fault severity. A classification pattern value of a subsystem with a relatively severe fault degree may have a value close to 1, and a classification pattern value of a subsystem with a relatively weak fault degree may have a value close to 0. For example, the classification pattern value may be represented as '0.1, 0.3, 0, 0.1, and 0.5'. In this case, because the sum of the classification pattern values is kept constant (in this case, '1'), it is possible to indicate relative fault severity between subsystems.

Figure 8:
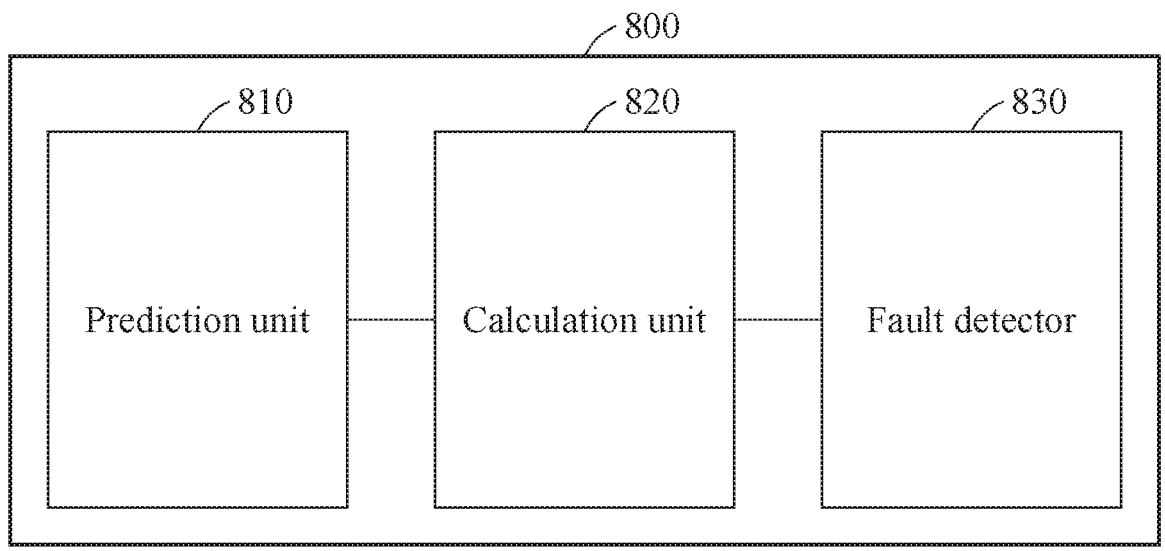
FIG. 8 is a block diagram illustrating a configuration of a multi-stage fault diagnosis device according to another embodiment.

FIG. 8 is a block diagram illustrating a configuration of a multi-stage fault diagnosis device according to another embodiment.

Referring to FIG. 8, a multi-stage fault diagnosis device 800 according to another embodiment may perform a fault detection method of a fuel cell system. The multi-stage fault diagnosis device 800 may include a prediction unit 810, a calculation unit 820, and a fault detector 830.

The prediction unit 810 may predict a characteristic value for each of a plurality of subsystems constituting the fuel cell system using one or more regression equations. The prediction unit 810 may predict a characteristic value based on a measurement value measured by a sensor included in the fuel cell system.

The calculation unit 820 may calculate residual values for subsystems corresponding to the characteristic value and the measurement value based on the characteristic value and the measurement value. Furthermore, the calculation unit 820 may calculate the ratio of a value obtained by subtracting a minimum residual value from the residual value to a value obtained by subtracting the minimum residual value from a maximum residual value of each subsystem and may normalize the residual value.

The fault detector 830 may detect a subsystem, a fault of which occurs, among the subsystems using the residual values for the subsystems and a classifier. To detect the subsystem, the fault of which occurs, the fault detector 830 may determine the residual pattern values for the subsystems based on the result of comparing a residual value for each subsystem with a threshold corresponding to each subsystem. The fault detector 830 may obtain a classification pattern value for fault detection using a classifier which receives the determined residual pattern value and may determine whether the fault occurs in any of the subsystems using the obtained classification pattern value.

Embodiments described above may be implemented with a hardware component, a software component, and a combination thereof. For example, the devices, methods, and components illustrated in the embodiments may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner Software and data may be recorded in one or more computer-readable storage media.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A multi-stage fault diagnosis method for a fuel cell system, performed by a multi-stage fault diagnosis device, the method comprising:
    dividing the fuel cell system into a hierarchy including, in descending order, a system, a subsystem, an upper-level component, a lower-level component, and an element; and
    diagnosing a fault of the fuel cell system in a sequence corresponding to the hierarchy;
    wherein the subsystem includes a stack and a balance of plant (BOP); and
    wherein the method further comprises, in response to detecting the fault, determining whether the fault is irreversible due to an internal part of the stack, or reversible due to the BOP.

2. The method of claim 1, wherein the BOP includes an air supply device, a heat management device, a fuel supply device, a water management device, and a power inverter and controller.

3. A multi-stage fault diagnosis method for a fuel cell system, performed by a multi-stage fault diagnosis device, the method comprising:
    detecting a subsystem, a fault of which occurs, in the fuel cell system composed of a plurality of subsystems; and
    detecting an upper-level component, which causes the fault, among upper-level components included in the subsystem, the fault of which occurs, using measurement data and a control signal;
    wherein the fuel cell system includes subsystems including a stack, an air supply device, a heat management device, a fuel supply device, a water management device, and a power inverter and controller;
    wherein the detecting of the subsystem, the fault of which occurs, includes:
    when it is detected that the fault occurs in the fuel cell system, determining whether the fault occurs in the stack or a balance of plant (BOP) including the air supply device, the heat management device, the fuel supply device, the water management device, and the power inverter and controller; and
    wherein the determining whether the fault occurs includes:
    determining whether the fault is irreversible due to an internal part of the stack or is reversible due to the BOP.

4. The method of claim 3, further comprising:
    detecting a lower-level component, which causes the fault, among one or more lower-level components included in the upper-level component which causes the fault.

5. The method of claim 4, further comprising:
    detecting an element, which causes the fault, among one or more elements included in the lower-level component which causes the fault.

6. The method of claim 3, wherein the detecting of the subsystem, the fault of which occurs, includes:
    detecting the subsystem, the fault of which occurs, based on measurement data and a control signal for the plurality of subsystems.

7. The method of claim 3, wherein the multi-stage fault diagnosis device performs fault diagnosis for only the subsystem, the fault of which occurs, in the fuel cell system and does not perform the fault diagnosis for the other subsystems.

8. The method of claim 7, wherein the performing of the fault diagnosis for the fuel cell system includes:
    predicting a characteristic value for each of the plurality of subsystems constituting the fuel cell system;
    calculating a residual value for each subsystem based on the characteristic value and a measurement value; and
    detecting the subsystem, the fault of which occurs, among the subsystems using residual values for the subsystems and a classifier.

9. The method of claim 8, wherein the detecting includes:
    determining a residual pattern value for the subsystems based on a result of comparing the residual value for each subsystem with a threshold corresponding to each subsystem.

10. The method of claim 9, wherein the detecting includes:
    obtaining a classification pattern value for fault detection using the classifier which receives the residual pattern value; and
    determining the subsystem, the fault of which occurs, among the subsystems using the obtained classification pattern value.

11. The method of claim 10, wherein the classifier obtains the classification pattern value based on machine learning including at least one of an artificial neural network (ANN), a support vector machine (SVM), a linear regression equation, a general regression neural network (GRNN), and ensemble regression.

12. The method of claim 9, wherein the threshold is set based on a standard deviation value of a residual value calculated in a state where each subsystem is normal.

13. The method of claim 8, wherein the predicting of the characteristic value includes:
    predicting the characteristic value using at least one of an artificial neural network (ANN), a support vector machine (SVM), a linear regression equation, a general regression neural network (GRNN), and ensemble regression.

14. A computer-readable storage medium storing instructions for executing the method of claim 1.

15. A multi-stage fault diagnosis device for performing a multi-stage fault diagnosis method for a fuel cell system, the device comprising:
    a subsystem fault detector to detect a subsystem, a fault of which occurs, in the fuel cell system composed of a plurality of subsystems;
    a component fault detector to detect an upper-level component, which causes the fault, among upper-level components included in the subsystem, the fault of which occurs, using measurement data and a control signal;
    a prediction unit to predict a characteristic value for each of the plurality of subsystems; and a calculation unit to calculate a residual value for each subsystem, the residual value corresponding to a difference between the characteristic value and a measurement value;

wherein the multi-stage fault diagnosis device determines a residual pattern value for the plurality of subsystems based on a result of comparing the residual value for each subsystem with a threshold corresponding to each subsystem.

16. The device of claim 15, wherein the component fault detector detects a lower-level component, which causes the fault, among one or more lower-level components included in the upper-level component which causes the fault, further comprising:

an element fault detector to detect an element, which causes the fault, among one or more elements included in the lower-level component which causes the fault.

17. A multi-stage fault diagnosis device for performing a multi-stage fault diagnosis method, the device comprising:

a prediction unit to predict a characteristic value for each of a plurality of subsystems constituting a fuel cell system, the characteristic value corresponding to a formula for calculating a specific measurement value using a measurement value of a sensor which varies in characteristic or location;

a calculation unit to calculate a residual value for each subsystem, the residual value corresponding to a difference between the characteristic value and a measurement value; and a fault detector to detect a subsystem, a fault of which occurs, among the subsystems using residual values for the subsystems and a classifier;

wherein the multi-stage fault diagnosis device determines a residual pattern value for each subsystem based on a pattern where the residual value for each subsystem deviates from a threshold.

* * * * *